United States Patent
Sandstrom

(10) Patent No.: US 10,208,189 B2
(45) Date of Patent: Feb. 19, 2019

(54) TIRE WITH TREAD WITH OXIDIZED CARBON BLACK

(71) Applicant: The Goodyear Tire & Rubber Company, Akron, OH (US)

(72) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 184 days.

(21) Appl. No.: 15/478,286

(22) Filed: Apr. 4, 2017

(65) Prior Publication Data

US 2018/0282522 A1    Oct. 4, 2018

(51) Int. Cl.
| | |
|---|---|
| C08K 3/04 | (2006.01) |
| C08K 5/20 | (2006.01) |
| C08K 9/02 | (2006.01) |
| C08K 13/06 | (2006.01) |
| B60C 1/00 | (2006.01) |
| C09C 1/56 | (2006.01) |

(52) U.S. Cl.
CPC .............. *C08K 9/02* (2013.01); *B60C 1/0016* (2013.01); *C08K 3/04* (2013.01); *C08K 5/20* (2013.01); *C08K 13/06* (2013.01); *C09C 1/565* (2013.01)

(58) Field of Classification Search
None
See application file for complete search history.

(56) References Cited

U.S. PATENT DOCUMENTS

| | | | |
|---|---|---|---|
| 4,075,140 A | 2/1978 | Hunt | 260/5 |
| 5,248,722 A | 9/1993 | DeTrano et al. | 524/496 |
| 5,723,531 A | 3/1998 | Visel et al. | 524/496 |
| 5,726,237 A | 3/1998 | Araki et al. | 524/495 |
| 5,962,526 A * | 10/1999 | Yu | A61K 8/347 514/557 |
| 6,590,017 B1 * | 7/2003 | Hergenrother | B60C 1/00 524/210 |

(Continued)

OTHER PUBLICATIONS

EPO search report completed Jun. 8, 2018.

(Continued)

*Primary Examiner* — Peter A Salamon
(74) *Attorney, Agent, or Firm* — Henry C. Young, Jr.

(57) ABSTRACT

This invention relates to a tire with a tread of rubber composition with reinforcing filler containing oxidized rubber reinforcing carbon black together with at least one amide additive. In one embodiment, the invention relates to a truck tire intended for heavy duty performance with a tread rubber composition comprised of natural cis 1,4-polyisoprene rubber containing reinforcing filler comprised of oxidized rubber reinforcing carbon black together with at least one amide additive. Such amide additive is comprised of at least one amide of Formula I:

(I)

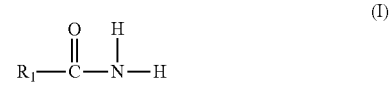

wherein $R_1$ is an alkyl radical comprised of from 12 to 36 carbon atoms, an alkenyl radical comprised of from 12 to 36 carbon atoms or alkadienyl radical comprised of from 12 to 36 carbon atoms.

20 Claims, 2 Drawing Sheets

(56) References Cited

U.S. PATENT DOCUMENTS

| | | | |
|---|---|---|---|
| 8,735,487 B2 | 5/2014 | Matthisen et al. | 524/493 |
| 9,175,150 B2 | 11/2015 | Rumpf et al. | C08K 5/3472 |
| 2005/0234165 A1 | 10/2005 | Schaal et al. | |
| 2006/0130948 A1* | 6/2006 | Sandstrom | B60C 17/06 152/158 |
| 2006/0130952 A1* | 6/2006 | Sandstrom | B60C 11/02 152/537 |
| 2013/0046064 A1* | 2/2013 | Herd | B60C 1/0016 525/331.7 |
| 2013/0061998 A1* | 3/2013 | Sandstrom | B60C 15/0072 152/553 |
| 2013/0203889 A1* | 8/2013 | Lopitaux | C08L 9/06 523/156 |
| 2013/0240098 A1* | 9/2013 | Zhao | B60C 1/0016 152/209.1 |
| 2013/0289165 A1* | 10/2013 | De Landtsheer | B60C 1/00 523/351 |
| 2018/0282522 A1* | 10/2018 | Sandstrom | C08K 9/02 |

OTHER PUBLICATIONS

Mironyuk, et al. Vulcanization of ethylene-propylene rubbers by organic peroxides in the presence of acid fillers, published 1973.

\* cited by examiner

TIRE WITH TREAD WITH OXIDIZED CARBON BLACK

This invention relates to a tire with a tread of rubber composition with reinforcing filler containing oxidized rubber reinforcing carbon black together with at least one amide additive. In one embodiment, the invention relates to a truck tire intended for heavy duty performance with a tread rubber composition comprised of natural cis 1,4-polyisoprene rubber containing reinforcing filler comprised of oxidized rubber reinforcing carbon black together with at least one amide additive. Such amide additive is comprised of at least one amide of Formula I:

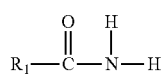
(I)

wherein $R_1$ is an alkyl radical comprised of from 12 to 36 carbon atoms, an alkenyl radical comprised of from 12 to 36 carbon atoms or alkadienyl radical comprised of from 12 to 36 carbon atoms.

BACKGROUND OF THE INVENTION

Vehicular tires are sometimes desired to have rubber treads having a beneficially reduced hysteresis together with acceptable abrasion resistance physical property. Acceptable tear resistance physical property may also be desired.

Tires, such as truck tires intended for heavy duty performance, are sometimes desired to have treads of rubber composition of such properties.

Reduced rubber hysteresis property for a tire tread rubber composition is often desired to promote reduced internal heat generation within the tread during tire service and to promote reduced tire rolling resistance of the tire itself leading to reduced vehicular energy expenditure with an accompanying reduction in vehicular fuel consumption (beneficial increase in fuel economy) for the associated vehicle. Predictive beneficially reduced hysteresis for the tread rubber composition is normally evidenced by at least one of increased rebound physical property and decreased tangent delta (tan delta) physical property for the cured rubber composition.

An increased stiffness property for a tire tread rubber composition is also often desired to promote tire handling characteristics for the tire. Predictive beneficially increased stiffness of the tire tread rubber composition is normally evidenced, for example, by an increased storage modulus (G') property of the cured rubber composition at low strains (low dynamic test elongations).

For this invention, a tire tread rubber composition is provided which contains reinforcing filler comprised primarily of rubber reinforcing carbon black where the rubber reinforcing carbon black is comprised primarily of rubber reinforcing carbon black having an oxidized surface.

The use of surface oxidized carbon black in place of a significant portion of the rubber reinforcing carbon black (carbon black which is not such oxidized carbon black) has been observed to provide a rubber composition having a significant and beneficially reduced hysteresis property, which may be desirable for a tire tread composition (e.g. lower tan delta physical property), to thereby promote a reduction in internal heat generation during tire service. However, it has also been observed that a stiffness property of the rubber composition may be reduced, often to a considerable extent as evidenced by a reduction in its storage modulus G'. Further, a reduction in abrasion resistance of the rubber composition may be experienced which is normally undesirable for a tread rubber composition.

An additional significant observed deficiency by use of the surface oxidized carbon black in place of a significant portion of the rubber reinforcing carbon black in a rubber composition has been a significant increase in its electrical resistivity (reduction in electrical conductivity) apparently resulting from the oxidized surface of the carbon black. In this manner, an undesirable buildup of electrical energy within the tire is promoted by a resistance to transmission of internally generated electrical energy within the tire through the tire tread for its emission from the tire tread surface to the ground.

A challenge is therefore undertaken to evaluate promoting an increase in the rubber composition stiffness or the rubber composition abrasion resistance, as well as promoting a reduction of its electrical resistivity (increasing its electrical conductivity), particularly for a tire tread rubber composition where a significant portion of its carbon black reinforcing filler is comprised of surface oxidized carbon black.

To meet such significant challenge, it is desired to evaluate providing an additive comprised of an amide of formula (I) for such rubber composition:

(I)

wherein $R_1$ is an alkyl radical comprised of from 12 to 36 carbon atoms, an alkenyl radical comprised of from 12 to 36 carbon atoms or alkadienyl radical comprised of from 12 to 36 carbon atoms.

In the description of this invention, the terms "compounded" rubber compositions and "compounds" are used to refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

SUMMARY AND PRACTICE OF THE INVENTION

In accordance with this invention, a pneumatic tire is provided having a circumferential rubber tread intended to be ground-contacting, where said tread is a rubber composition comprised of, based on parts by weight per 100 parts by weight elastomer (phr):

(A) elastomer(s) comprised of:
 (1) at least one conjugated diene-based elastomer, comprised of:
  (a) about 0 to about 35, alternately about 10 to about 35 phr of cis 1,4-polyisoprene rubber, and
  (b) about 65 to about 100, alternately about 65 to about 90 phr of at least one additional diene-based elastomer, or
 (2) at least one conjugated diene-based elastomer, comprised of:
  (a) about 55 to about 100, optionally about 55 to about 90, phr of cis 1,4-polyisoprene natural rubber, and (b) about 0 to about 45, alternately about 10 to about 45, phr of additional diene-based elastomer;

(B) about 25 to about 125, alternately from about 40 to about 95, phr of reinforcing filler comprised of about 55 to about 100, alternately about 80 to about 100, weight percent rubber reinforcing black comprised of from about 20 to about 100, alternately from about 35 to about 90 weight percent surface oxidized carbon black, and (C) about 0.5 to about 20, alternately from about 1 to about 10 phr of amide of formula (I):

(I)

wherein $R_1$ is an alkyl radical comprised of from 12 to 36 carbon atoms, an alkenyl radical comprised of from 12 to 36 carbon atoms or alkadienyl radical comprised of from 12 to 36 carbon atoms.

Representative of an amide of Formula (I) is an amide of a saturated or unsaturated monovalent amine, or saturated or unsaturated polyvalent amine representative of which are, for example, and not intended to be limiting, caprylamine, lauralamine, palmitylamine, stearylamine, oleylamine, myristylamine, methylenediamine, ethylenediamine, hexamethylenediamine, and ammonia. In one embodiment, the amide may be at least one of caprylamide, laurylamide, palmitylamide, stearamide, oleamide, and myristlamide. In one embodiment, the amide may be comprised primarily of stearamide. It is appreciated that such stearamide may not be a pure stearamide in a sense of not being entirely composed of stearamide, although it might be referred to generally as being comprised of as a stearamide, it may be comprised of, for example, about 80 to about 100, alternately about 90 to about 100 weight percent stearamide with the remainder be comprised of, for example, at least one of at least one additional amide such as for example at least one of oleamide and palmitamide or even laurylamide.

In one embodiment, said additional diene-based elastomer for the rubber composition may be comprised of, for example, at least one of polybutadiene rubber (e.g. cis 1,4-polybutadiene rubber), styrene/butadiene rubber (SBR), synthetic cis 1,4-polyisoprene rubber and 3,4-polyisoprene rubber. In one embodiment, the styrene/butadiene rubber may be a functionalized styrene/butadiene rubber (functionalized SBR) containing at least one functional group reactive with said carboxyl and/or hydroxyl groups contained on said oxidized carbon black. Such functional group(s) may also be reactive with hydroxyl groups on said precipitated silica, if used. In one embodiment, said functional groups may be comprised of at least one of siloxy, amine and thiol groups.

Said additional diene-based elastomers are not intended to include isobutylene based copolymers with various dienes such as, for example, isobutylene based butyl rubbers.

In one embodiment, said reinforcing filler may also contain about 10 to about 50, alternately about 10 to about 30, phr of precipitated silica together with silica coupler having a moiety reactive with hydroxyl groups on said precipitated silica and another different moiety interactive with said diene-based elastomers.

In practice, said silica coupler may be comprised of:
(A) bis(3-trialkoxysilylalkyl) polysulfide having an average of from 2 to about 4 connecting sulfur atoms in its polysulfidic bridge, or
(B) alkoxyorganomercaptosilane.

In one embodiment, said bis(3-trialkoxysilylalkyl) polysulfide is comprised of bis(3-triethoxysilylpropyl) polysulfide.

In one embodiment, said precipitated silica may be the product of precipitated silica and silica reacted in situ within the rubber composition.

In one embodiment, said precipitated silica may be pre-reacted with said silica coupler to form a composite thereof prior to addition of said composite to the rubber composition. For such embodiment, if desired, additional precipitated silica and/or additional silica coupler may be added to the rubber composition.

It is appreciated that such silica coupler may be reactive with both of hydroxyl groups of said precipitated silica and with, for example, carboxyl and/or hydroxyl groups contained on said surface oxidized carbon black to create a complex structured rubber reinforcement.

In practice, such oxidized rubber reinforcing carbon black may be produced by hydrogen peroxide or ozone treatment of a conventional rubber reinforcing carbon black, to produce a carbon black that contains carboxyl and/or hydroxyl groups on its surface. For example, see U.S. Patent Publication No. 2013/0046064.

Accordingly, such oxidized carbon black is at least one of hydrogen peroxide or ozone treated rubber reinforcing carbon black.

Accordingly, such oxidized carbon black is a rubber reinforcing carbon black containing at least one of carboxyl and hydroxyl groups on its surface.

Representative examples of conventional rubber reinforcing carbon blacks (non-oxidized rubber reinforcing carbon blacks) are, for example and not intended to be limiting, referenced in *The Vanderbilt Rubber Handbook*, 13$^{th}$ edition, 1990, on Pages 417 and 418 with their ASTM designations. Such rubber reinforcing carbon blacks may have iodine absorptions ranging from, for example and not intended to be limiting, 60 to 240 g/kg and DBP values ranging from, for example and not intended to be limiting, 34 to 150 cc/100 g.

It is readily understood by those having skill in the art that the vulcanizable rubber composition would be compounded by methods generally known in the rubber compounding art. In addition said compositions could also contain fatty acid, zinc oxide, waxes, antioxidants, antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from 1.5 to 6 phr being often preferred.

The rubber composition may also contain petroleum based rubber processing oil and/or vegetable triglyceride oil (e.g. comprised of at least one of soybean, sunflower, rapeseed and canola oil).

Typical amounts of antioxidants may comprise, for example, about 1 to about 5 phr thereof. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr thereof. Typical amounts of fatty acids, if used, which can include stearic acid, comprise about 0.5 to about 3 phr thereof. Typical amounts of zinc oxide may comprise, for example, about 2 to about 5 phr thereof. Typical amounts of waxes comprise about 1 to about 5 phr thereof. Often microcrystalline waxes are used. Typical amounts of peptizers, when used, may be used in amounts of, for example, about 0.1 to about 1 phr thereof. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 1.5, phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, sulfenamides, and xanthates. Often desirably the primary accelerator is a sulfenamide. If a second accelerator is used, the secondary accelerator is often desirably a guanidine such as for example a diphenylguanidine.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the pneumatic tire containing the tire tread of the present invention is generally carried out at conventional temperatures in a range of, for example, from about 125° C. to 200° C. Often it is desired that the vulcanization is conducted at temperatures ranging from about 150° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. The parts and percentages are parts by weight, usually parts by weight per 100 parts by weight rubber (phr) unless otherwise indicated.

Example I

Evaluation of Use of Stearamide

In this example, exemplary rubber compositions for a tire tread were prepared for evaluation for use of stearamide in combination with reinforcing filler comprised of surface oxidized carbon black. As previously indicated, it is considered that oxidized carbon black contains carboxyl and/or hydroxyl groups on its surface as a result of such surface oxidation.

A control rubber composition was prepared as Control rubber Sample A with reinforcing filler comprised of conventional rubber reinforcing carbon black.

Experimental rubber compositions were prepared as Experimental rubber Samples B and C containing surface oxidized rubber reinforcing carbon black.

Control rubber Sample A and Experimental rubber Sample B contained 5 phr of a processing aid comprised of petroleum based rubber processing oil.

For Experimental rubber Sample C, the petroleum based rubber processing oil was replaced with stearamide.

The rubber compositions are illustrated in the following Table 1.

TABLE 1

| | Parts by Weight (phr) | | |
| --- | --- | --- | --- |
| | Control | Experimental | |
| Material | Sample A | Sample B | Sample C |
| First Non-Productive mixing step (NP1) | | | |
| Natural rubber (cis 1,4-polyisoprene) | 100 | 100 | 100 |
| Rubber reinforcing carbon black (N234)[1] | 30 | 0 | 0 |
| Surface oxidized carbon black[2] | 0 | 30 | 30 |
| Petroleum based rubber processing oil | 3 | 3 | 0 |
| Stearamide[3] | 0 | 0 | 3 |
| Zinc oxide | 3 | 3 | 3 |
| Fatty acids[4] | 1 | 1 | 1 |
| Second Non-Productive mixing step (NP2) | | | |
| Rubber reinforcing carbon black (N234)[1] | 20 | 0 | 0 |
| Surface oxidized carbon black[2] | 0 | 20 | 20 |
| Petroleum based rubber processing oil | 2 | 2 | 0 |
| Stearamide[3] | 0 | 0 | 2 |
| Productive mixing step (P) | | | |
| Antioxidant | 0.5 | 0.5 | 0.5 |
| Sulfur | 1.5 | 1.5 | 1.5 |
| Sulfur cure accelerator[5] | 1.2 | 1.2 | 1.2 |

[1]Carbon black as N234, an ASTM designation
[2]Surface oxidized N234 carbon black as CD2125XZ from the Birla Carbon Company
[3]Stearamide as Crodamide SR from the Croda Universal Company
[4]Fatty acids comprised of stearic, palmitic and oleic acids
[5]Sulfur cure accelerator as a sulfenamide The rubber Samples were prepared by sequential mixing steps in an internal rubber mixer comprised of two sequential non-productive (NP) mixing steps to a mixing temperature of about 160° C. without sulfur curatives followed by a productive (P) mixing step in which sulfur and sulfur cure accelerator(s) were added to a mixing temperature of about 110° C. The rubber compositions were allowed to cool between mixing steps. Sequential rubber mixing comprised of non-productives followed by a final productive mixing procedure is well known to those having skill in such art.

The following Table 2 illustrates cure behavior and various physical properties of rubber compositions based upon the formulations of Table 1 and reported herein as Control rubber Sample A and Experimental rubber Samples B and C. Where cured rubber samples are reported, such as for the stress-strain, rebound and abrasion values, the rubber samples were cured for about 14 minutes at a temperature of about 160° C.

TABLE 2

| | Parts by Weight (phr) | | |
|---|---|---|---|
| | Control | Experimental | |
| Material | Sample A | Sample B | Sample C |
| Natural rubber (cis 1,4-polyisoprene rubber) | 100 | 100 | 100 |
| Rubber reinforcing carbon black (N234) | 50 | 0 | 0 |
| Surface oxidized N234 carbon black | 0 | 50 | 50 |
| Rubber processing oil, petroleum based | 5 | 5 | 0 |
| Stearamide | 0 | 0 | 5 |
| Properties of Rubber Compounds, Processability of uncured rubber, RPA[1] | | | |
| Uncured storage modulus (G'), (KPa), 0.83 Hertz, 100° C., 15% strain | 148 | 213 | 154 |
| Stiffness of cured rubber Low Strain, ARES Test[2] | | | |
| Storage modulus (G'). (KPa), 10 Hertz, 10% strain, 90° C. | 1567 | 1064 | 1385 |
| High Strain, Tensile Test | | | |
| Modulus, 300% strain, (MPa) | 13.3 | 8.4 | 10.4 |
| Hysteresis Prediction | | | |
| Rebound (100° C., %), higher is better | 64 | 68 | 70 |
| ARES Test[2], 10 Hz, 10% strain, 90° C. | | | |
| Tan delta (lower is better) | 0.148 | 0.098 | 0.098 |
| Tear Resistance, 95° C.[3] | | | |
| Newtons (higher is better) | 145 | 193 | 200 |
| Treadwear Resistance Prediction | | | |
| DIN abrasion[4] (lower values are better) | 120 | 171 | 110 |
| Grosch abrasion rate, high severity[5], (lower values are better) | 984 | 1956 | 874 |
| Electrical Resistivity, 23° C. | | | |
| Mega ohm * cm, lower values are better | 0.63 | 430,000 | 2,300 |

[1]RPA test: test of rubber samples with Rubber Process Analyzer instrument which is an instrument for determining various viscoelastic properties of rubber samples including storage modulus (G') and tangent delta (tan delta) physical properties at various temperatures and frequencies at various torsions sometimes referred to as "percent strains" (dynamic elongations).
[2]ARES test: test of rubber samples with an ARES Rotational Rheometer rubber analysis instrument which is an instrument for determining various viscoelastic properties of rubber samples, including their storage modulii (G') over a range of frequencies and temperatures in torsion.
[3]Data obtained according to a tear strength (tear resistance) test to determine interfacial adhesion between two samples of a rubber composition. Such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.
[4]DIN abrasion test: ASTM D5963
[5]Grosch abrasion rate as run on a LAT-100 Abrader and measured in terms of mg/km of rubber abraded away. The test rubber sample is placed at a slip angle under constant load (Newtons) as it traverses a given distance on a rotating abrasive disk (disk from HB Schleifmittel GmbH). A high abrasion severity test may be run, for example, at a load of 70 newtons, 12° slip angle, disk speed of 20 km/hr for a distance of 250 meters.

From Table 2 it is observed that:

(A) Processability of the Uncured Rubber Composition

Inclusion of the surface oxidized carbon black (rubber Sample B) is observed to significantly increase the uncured storage modulus (G') of the rubber composition by over 40 percent to a value of 213 KPa compared to a value of 148 KPa for Control rubber Sample A which contained carbon black which had not been surface oxidized. Therefore, it is concluded that the inclusion of the surface oxidized carbon black can significantly increase the energy to process the rubber composition such as, for example, by mixing and extrusion.

A significant discovery is evident by addition of the stearamide to the rubber composition containing the surface oxidized carbon black (rubber Sample C) in a sense that it is observed to significantly decrease the uncured storage modulus (G') of the rubber composition to a value of 154 KPa compared to a value of 213 KPa for rubber Sample B, which contained the oxidized carbon black without the stearamide, which is beneficially similar to the G' value of 148 for the rubber composition in which a carbon black was used which was not surface oxidized (Control rubber Sample A).

(B) Stiffness of Cured Rubber, Low Strain (10 Percent) Modulus

Inclusion of the surface oxidized carbon black (rubber Sample B) is observed to significantly decrease the stiffness of the cured rubber composition (G') at low strain of 10 percent by over 30 percent to a value of 1064 KPa compared to a value of 1567 KPa for Control rubber Sample A, which contained carbon black which had not been surface oxidized. Therefore, it is concluded that the inclusion of the surface oxidized carbon black significantly reduced the stiffness of the cured rubber composition at low strain which may be an undesirable effect for a tire tread rubber composition.

A significant discovery is evident by addition of the stearamide to the rubber composition containing the surface oxidized carbon black (rubber Sample C) for which it is observed to significantly increase stiffness of the cured rubber surface oxidized carbon black containing rubber composition in a sense of increasing its storage viscosity (G') at low strain to a value (1385) which approaches the value of 1567 KPa for the Control rubber Sample A in which a carbon black was used which was not surface oxidized.

(C) Stiffness of Cured Rubber, High Strain (300 Percent) Modulus

Inclusion of the surface oxidized carbon black (rubber Sample B) is observed to significantly decrease the 300 percent modulus of the cured rubber composition by over 35 percent to a value of 8.4 MPa compared to a value of 13.3 MPa for Control rubber Sample A which contained carbon black which had not been surface oxidized.

A significant discovery is evident by addition of the stearamide to the rubber composition containing the surface oxidized carbon black (rubber Sample C) for which it is observed to significantly increase the 300 percent modulus of the cured rubber composition containing the surface oxidized carbon black in a sense of increasing its 300 percent modulus property to a value of 10.4 MPa which approaches the value of 13.3 MPa for the Control rubber Sample A which contained carbon black which was not surface oxidized.

(D) Hysteresis Prediction

The hot rebound property was beneficially increased for Experimental rubber Sample B which contained the oxidized carbon black to a value of 68 compared to a value of 64 for Control rubber Sample A without the oxidized carbon back, which is an indication of a beneficial reduction of the predictive hysteresis property for the rubber composition to thereby promote a reduction in internal heat generation within the rubber composition during tire service. The hot rebound property, and therefore the predictive hysteresis property of rubber Sample C, is somewhat further beneficially increased to a value of 70 by the addition of the stearamide to the surface oxidized carbon lack containing rubber composition, which indicates a further advantage of the addition of the stearamide to the surface oxidized carbon black containing rubber composition with its aforesaid achievements of improved uncured rubber processability and improved cured rubber stiffness without loss of the beneficial cured rubber hysteresis improvement promoted by the surface oxidized carbon black.

It is observed that the tan delta property of the Control rubber Sample A of 0.148 was beneficially reduced by at least 33 percent to a value of 0.098 for Experimental rubber Sample B by addition of the surface oxidized carbon black, which is a further indication of significantly improved (reduced) hysteresis for the rubber composition as was previously indicated by the increase in hot rebound property for the rubber composition.

A significant discovery is evident for Experimental rubber Sample C in which stearamide was added to the surface oxidized carbon black containing rubber Sample B which apparently did not affect its tan delta physical property (did not apparently affect hysteresis) of the rubber composition) which amplifies the aforesaid discovered achievements of processability and stiffness made without significantly affecting the hysteresis of the rubber composition containing the surface oxidized carbon black based on its tan delta and hot rebound properties.

(E) Tear Resistance (Test at 95° C.)

Inclusion of the surface oxidized carbon black (rubber Sample B) in the rubber composition of Sample A is observed to beneficially increase the tear resistance of the cured rubber composition to a value of 193 Newtons compared to a value of 145 Newtons for Control rubber Sample A which contained carbon black which had not been surface oxidized.

A significant discovery is evident by addition of the stearamide to the rubber composition containing the surface oxidized carbon black (rubber Sample C) for which it is observed to further increase the tear resistance of the rubber surface oxidized carbon black containing rubber composition to a value of 200 Newtons.

(F) Treadwear Resistance Predictions

Inclusion of the surface oxidized carbon black (rubber Sample B) is observed to significantly increase the DIN abrasion of the rubber composition to a value of 171 and increase the Grosch abrasion rate to a value of 1956, thereby predicting a significant treadwear loss for such compounds in tire applications, when compared to the abrasion values of 120 and 984, respectively, for the Control rubber Sample A without the surface oxidized carbon black.

A significant discovery is evident by addition of the stearamide to the rubber composition containing the surface oxidized carbon black (rubber Sample C) for which it is observed to significantly beneficially decrease the DIN abrasion and Grosch rate of abrasion values to values of 110 and 874, which are an improvement even over the values for Control rubber Sample A. This discovery is a significant addition to the aforesaid stiffness and hysteresis discoveries relating to addition of stearamide to the surface oxidized carbon black containing rubber compositions.

(G) Electrical Resistivity

A significant disadvantage of addition of the surface oxidized carbon black to the rubber composition is a resultant increase in the rubber composition's electrical resistance apparently as a result of modification of the carbon black surface which would inhibit the transmission of internal electrical energy generated within the tire during service of the tire through the rubber tire component containing the surface oxidized carbon black (e.g. tire tread).

This effect is evidenced by rubber Sample B (containing the surface oxidized carbon black) having an electrical resistivity of 430,000 Mega ohm*cm compared to a value of only 0.63 for Control rubber Sample A without the surface oxidized carbon black.

A significant discovery is evident by addition of the stearamide to the rubber composition containing the surface oxidized carbon black (rubber Sample C) for which it is observed to significantly reduce the electrical resistivity of the rubber composition to a value of 2,300 Mega ohm*cm.

Therefore, it is concluded that the positive benefits of surface oxidized carbon black in a rubber compound used as a replacement for conventional non-treated carbon black of improved hysteresis (reduction of predictive hysteresis property) and beneficial increase in tear strength are maintained with the addition of stearamide to the such compound. The observed unexpected discovery is that the addition of stearamide to the oxidized carbon black containing rubber composition resulted in improved processing for the uncured rubber composition, together with improved stiffness, tear and abrasion resistance for the cured rubber composition. A particularly unexpected discovery was the observed improved increase in electrical conductivity (reduction in electrical resistivity), resulting from addition of the stearamide to the oxidized carbon black containing rubber composition which is a very important benefit for a rubber composition when used in a tire component such as, for example a tire tread, to promote transmission of electrical energy through the tire for its transmission to the ground to thereby reduce electrical energy which might be stored within the tire.

In order to more clearly understand the significance of the data provided by this Example, drawings are provided to illustrate relationships between rubber compositions containing reinforcing filler comprised of the rubber reinforcing carbon black, containing reinforcing filler comprised of oxidized rubber reinforcing carbon black and reinforcing filler comprised of oxidized rubber reinforcing carbon black together with stearamide.

according to ARES test, over a range of percent strain values are compared to such curve for a natural rubber composition containing N234 carbon black.

Figure 2:
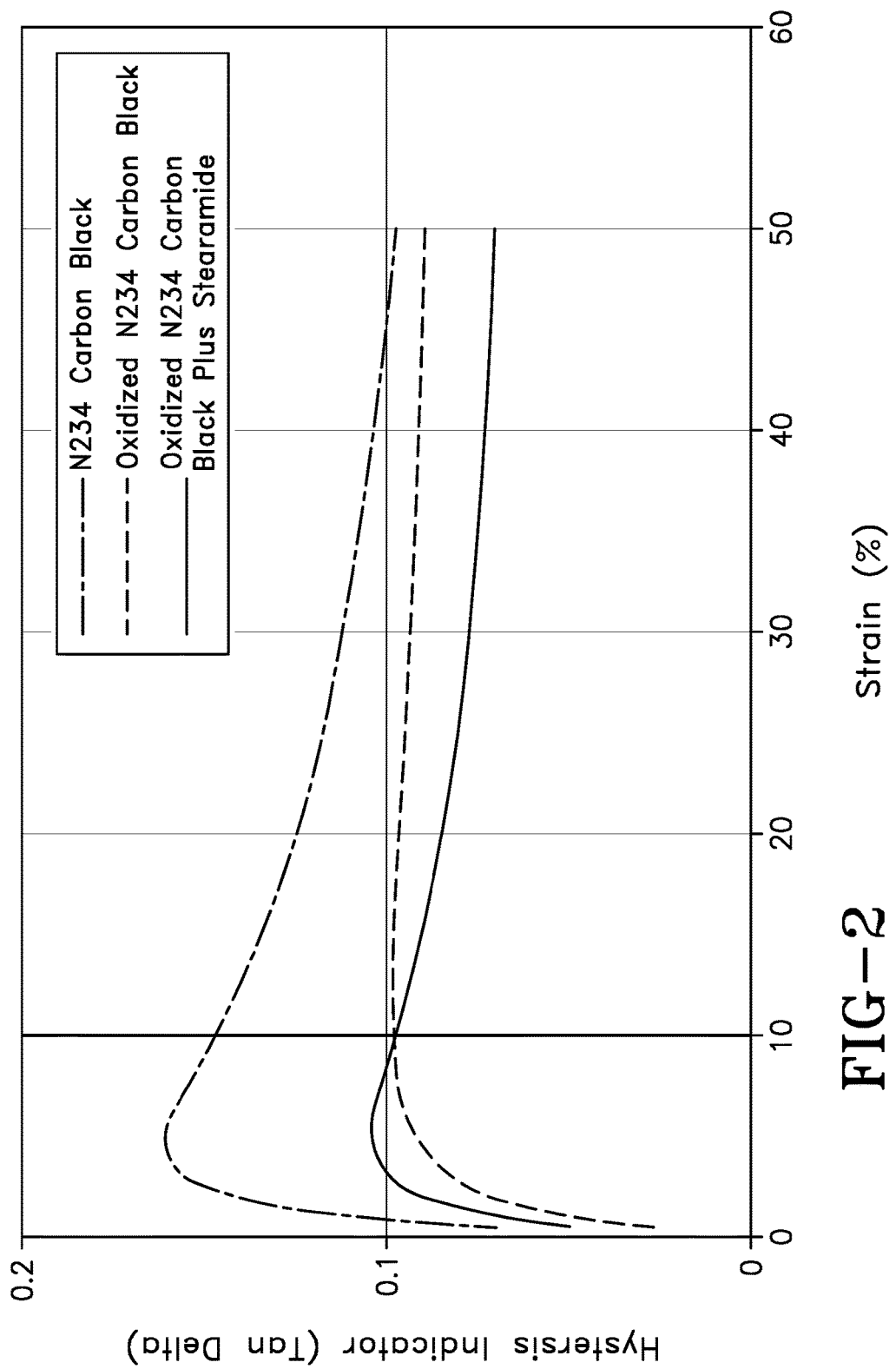

In FIG. 2, curves of natural rubber based rubber compositions containing oxidized N234 carbon black and containing oxidized carbon black together with stearamide in terms of hysteresis predictor in terms of its tangent delta (tan delta) physical property over a range of percent strain values are compared to such curve for a natural rubber composition containing N234 carbon black.

DRAWINGS

Figure 1:
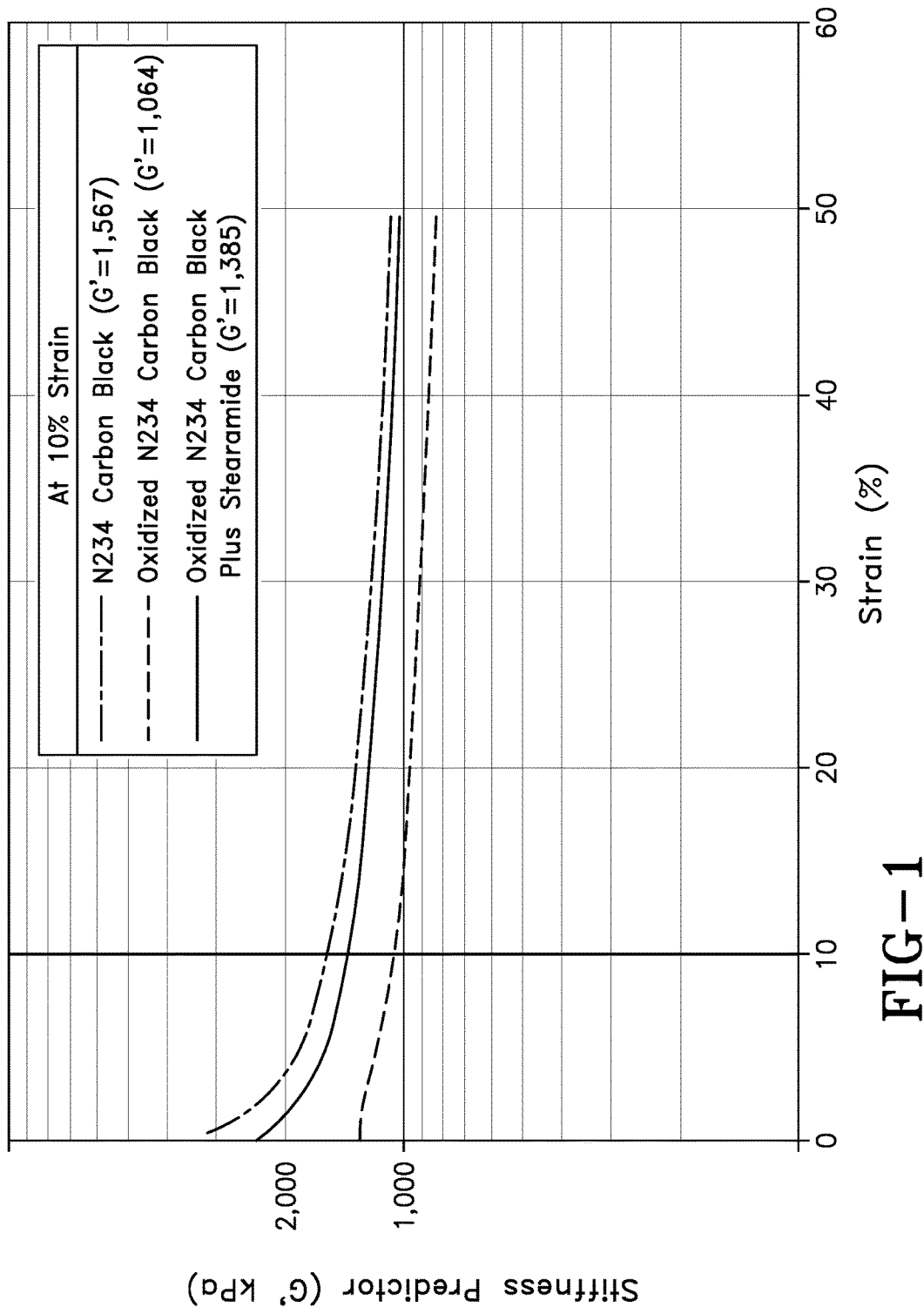
In FIG. 1, logimetric scaled curves of natural rubber compositions containing oxidized N234 carbon black and containing oxidized carbon black together with stearamide in terms of a stiffness predictor (storage modulus G' kPa)

It is seen from FIG. 1 that an inclusion of the oxidized carbon black in the rubber composition significantly reduced storage modulus G' stiffness predictor for the rubber composition over a wide range of strain values, including a strain value of 10 percent.

It is also seen from FIG. 1, in contrast, that an inclusion of stearamide with the oxidized carbon black beneficially significantly increased the storage modulus G' stiffness predictor for the rubber composition over a wide range of strain values, including a strain value of 10 percent, such that the storage modulus G' stiffness predictor beneficially approached the storage modulus G' value for the rubber composition containing the N234 carbon black.

It is seen from FIG. 2 that an inclusion of the oxidized carbon black significantly and beneficially reduced the tan delta property (beneficially reduced the hysteresis indicator property) for the rubber composition over a wide range of strain values, including a strain value of 10 percent.

The discovery is also seen from FIG. 2 that an inclusion of the stearamide with the oxidized carbon black further beneficially reduced the tan delta (reduced the predictive hysteresis indicator property) for the rubber composition over a wide range of strain values, with the tan delta values being about equal at a strain value of 10 percent when compared with the oxidized carbon black without stearamide.

From a visual inspection of the graphical plots of FIG. 1 and FIG. 2, it is therefore concluded that the addition of the stearamide to the oxidized carbon black containing rubber composition provided a significant improvement in desired stiffness predictor of the cured rubber over a broad strain range without detriment to the improved hysteresis indicator obtained for the cured rubber composition when using oxidized carbon black as a replacement for conventional untreated carbon black reinforcement for the rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a circumferential rubber tread of a rubber composition comprised of, based on parts by weight per 100 parts by weight elastomer (phr):
   (A) elastomer(s) comprised of:
      (1) at least one conjugated diene-based elastomer, comprised of:
         (a) about 0 to about 35 phr of cis 1,4-polyisoprene rubber, and
         (b) about 65 to about 100 phr of at least one additional diene-based elastomer, or
      (2) at least one conjugated diene-based elastomer, comprised of:
         (a) about 55 to about 100 phr of cis 1,4-polyisoprene natural rubber, and
         (b) about 0 to about 45 of at least one additional elastomer,
   (B) about 25 to about 125 phr of reinforcing filler comprised of about 55 to about 100 weight percent rubber reinforcing black comprised of from about 20 to about 100 weight percent surface oxidized carbon black, and
   (C) about 0.5 to about 20 phr of amide of formula (I):

wherein $R_1$ is an alkyl radical comprised of from 12 to 36 carbon atoms, an alkenyl radical comprised of from 12 to 36 carbon atoms or alkadienyl radical comprised of from 12 to 36 carbon atoms.

2. The tire of claim 1 wherein said amide is comprised of an amide of a saturated or unsaturated monovalent amine, or saturated or unsaturated polyvalent amine.

3. The tire of claim 1 wherein said amide is comprised of at least one of caprylamine, lauralamine, palmitylamine, stearylamine, oleylamine, myristylamine, methylenediamine, ethylenediamine, hexamethylenediamine, and ammonia.

4. The tire of claim 1 wherein said amide is comprised of at least one of caprylamide, laurylamide, palmitylamide, stearamide, oleamide, and myristlamide.

5. The tire of claim 1 wherein said amide is comprised of stearamide.

6. The tire of claim 1 wherein said amide is comprised of about 80 to about 100 percent stearamide with the remainder comprised of additional amide comprised of at least one of oleamide and palmitamide and laurylamide.

7. The tire of claim 1 wherein said oxidized carbon black is at least one of hydrogen peroxide or ozone treated rubber reinforcing carbon black.

8. The tire of claim 1 wherein said oxidized carbon black is a rubber reinforcing carbon black containing at least one of carboxyl and hydroxyl groups on its surface.

9. The tire of claim 1 wherein said additional diene-based elastomer is comprised of at least one of polybutadiene rubber, styrene/butadiene rubber, synthetic cis 1,4-polyisoprene rubber and 3,4-polyisoprene rubber.

10. The tire of claim 9 wherein said styrene/butadiene rubber is a functionalized styrene/butadiene rubber containing functional groups reactive with said carboxyl or hydroxyl groups on said oxidized carbon black.

11. The tire of claim 1 wherein said reinforcing filler contains about 10 to about 50 phr of precipitated silica together with silica coupler having a moiety reactive with hydroxyl groups on said precipitated silica and another different moiety interactive with said diene-based elastomers.

12. The tire of claim 11 wherein said silica coupler is comprised of:
   (A) bis(3-trialkoxysilylalkyl) polysulfide having an average of from 2 to about 4 connecting sulfur atoms in its polysulfidic bridge, or
   (B) alkoxyorganomercaptosilane.

13. The tire of claim 12 wherein said silica coupler is comprised of bis(3-triethoxysilylpropyl) polysulfide.

14. The tire of claim 12 wherein said coupler is comprised of alkoxyorganomercaptosilane.

15. The tire of claim 11 wherein said precipitated silica is a composite of said precipitated silica pre-reacted with said silica coupler.

16. The tire of claim 15 wherein said silica coupler is an alkoxyorganomercaptosilane.

17. The tire of claim 11 wherein said precipitated silica is a product of reaction of said precipitated silica and said silica coupler within said rubber composition.

18. The tire of claim 15 wherein said rubber composition contains additional precipitated silica and/or additional silica coupler.

19. The tire of claim 9 where said styrene/butadiene rubber of said additional rubber is tin or silicon coupled.

20. The rubber composition of claim 1 where said rubber composition is comprised of:
   (A) elastomer(s) comprised of at least one conjugated diene-based elastomer, comprised of:
      (1) about 55 to about 90 phr of cis 1,4-polyisoprene natural rubber, and
      (2) about 10 to about 45 of at least one additional elastomer,
   (B) about 25 to about 125 phr of reinforcing filler comprised of about 80 to about 100 weight percent rubber reinforcing black comprised of from about 35 to about 90 weight percent surface oxidized carbon black, and
   (C) about 1 to about 10 phr of said amide.

* * * * *